United States Patent [19]
Davis

[11] Patent Number: 5,805,706
[45] Date of Patent: Sep. 8, 1998

[54] APPARATUS AND METHOD FOR RE-ENCRYPTING DATA WITHOUT UNSECURED EXPOSURE OF ITS NON-ENCRYPTED FORMAT

[75] Inventor: Derek L. Davis, Phoenix, Ariz.

[73] Assignee: Intel Corporation, Santa Clara, Calif.

[21] Appl. No.: 633,581

[22] Filed: Apr. 17, 1996

[51] Int. Cl.⁶ .................................................. H04L 9/00
[52] U.S. Cl. .................................. 380/49; 380/25; 380/41
[58] Field of Search ................................ 380/4, 25, 49, 380/50

[56] References Cited

U.S. PATENT DOCUMENTS

| | | | |
|---|---|---|---|
| 4,558,176 | 12/1985 | Arnold et al. | 380/4 |
| 4,588,991 | 5/1986 | Atalla | 380/4 |
| 4,864,494 | 9/1989 | Kobus | 380/4 |
| 4,905,277 | 2/1990 | Nakamura | 380/4 |
| 5,381,480 | 1/1995 | Butter et al. | 380/50 |

*Primary Examiner*—Salvatore Cangialosi
*Attorney, Agent, or Firm*—Blakely, Sokoloff, Taylor & Zafman

[57] ABSTRACT

A cryptographic device formed as an integrated circuit encapsulated in an integrated circuit package. The cryptographic device decrypts information having a first encrypted format that is input into the cryptographic device producing information in a non-encrypted format. The information in the non-encrypted format is subsequently re-encrypted into a second encrypted format which is output from the cryptographic device. The decryption and re-encryption operations are accomplished entirely within the cryptographic device.

19 Claims, 4 Drawing Sheets

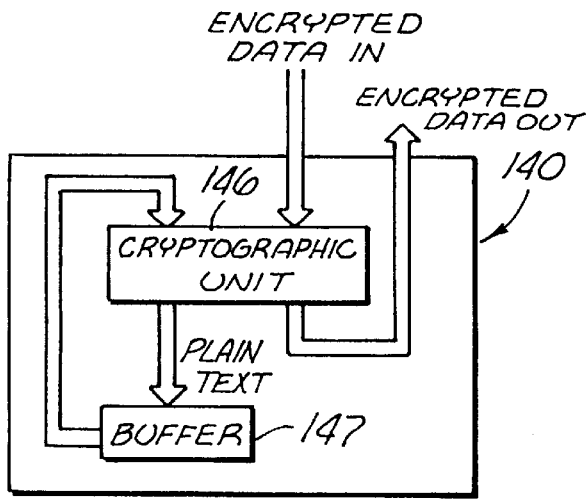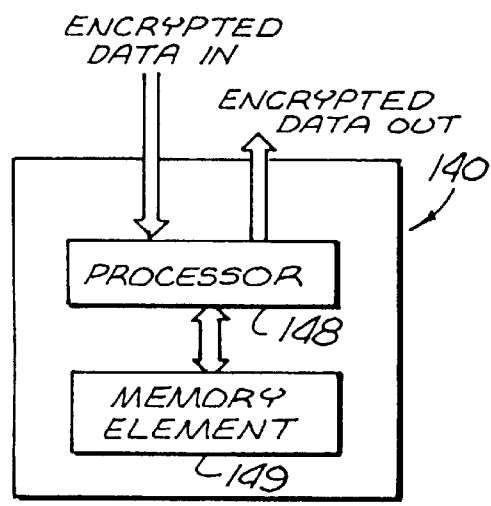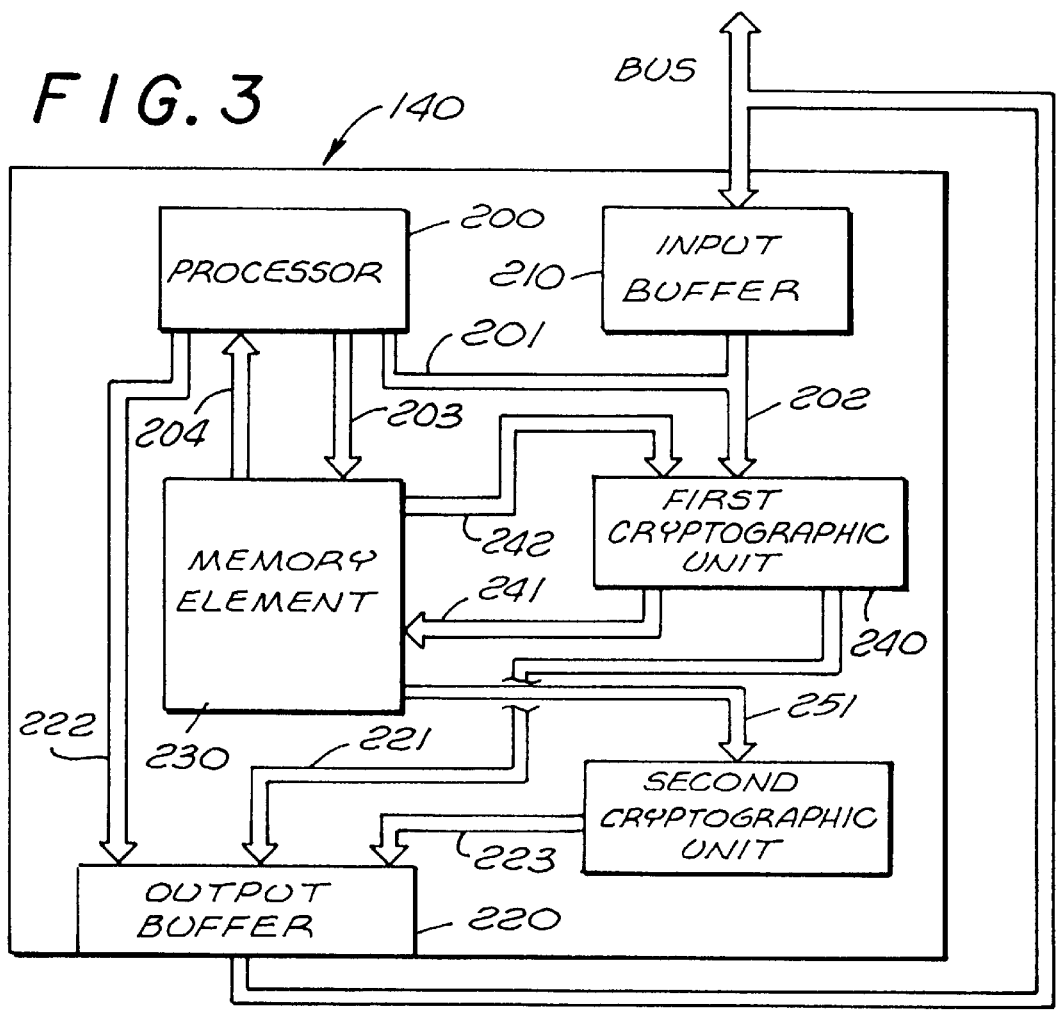

APPARATUS AND METHOD FOR RE-ENCRYPTING DATA WITHOUT UNSECURED EXPOSURE OF ITS NON-ENCRYPTED FORMAT

CROSS-REFERENCES TO RELATED APPLICATIONS

The named inventor of the present application has filed two co-pending United States Patent Applications entitled "Apparatus and Method for Providing Secured Communications" (application Ser. No. 08/251,486) now U.S. Pat. No. 5,539,828 "Secured Method for Providing Secured Communications" (application Ser. No. 08/538,869), pending and "A Method For Providing A Roving Software License In A Hardware Agent-Based System" (application Ser. No. 08/472,951), now U.S. Pat. No. 5,568,522 and a recently issued patent entitled "Roving Software License For A Hardware Agent" (U.S. Pat. No. 5,473,692). These applications and patent are owned by the same assignee of the present Application.

BACKGROUND OF THE INVENTION

1. Field of the Invention

The present invention relates to the field of cryptography. More particularly, the present invention relates to a cryptographic device which translates encrypted information from one encrypted format to another without unsecured exposure of its non-encrypted format.

2. Description of Art Related to the Invention

In today's society, it is becoming more and more desirable to transmit digital information (i.e., data, control or address) from one location to another in a manner which is clear and unambiguous to a targeted recipient, but incomprehensible to any illegitimate interlopers. Accordingly, before transmission, the digital information is typically encrypted by a host processor executing an encryption algorithm stored in main memory. A communication key specific to a targeted recipient is used for such encryption. Thereafter, the targeted recipient decrypts the encrypted information for his or her own use. This conventional cryptographic transmission technique is commonly used in governmental applications as well as for commercial applications where sensitive information (e.g., confidential, proprietary, etc.) is being transmitted.

Likewise, it is further becoming desirable to store digital information in an encrypted format within main memory or a mass storage device associated with a computer. This is done to prevent an unauthorized person from downloading sensitive information in a non-encrypted format (i.e., plain text) from main memory or a mass storage device onto a floppy disk. However, neither the storage of information in an encrypted format nor the conventional cryptographic transmission technique fully protects plain text from unsecured exposure (i.e., outside the confines of the element executing the cryptographic algorithm). For example, in order to transfer an encrypted document from one computer to another, the encrypted document would be decrypted to plain text and re-encrypted with a communication key specific to the targeted recipient. Thus, the plain text will be exposed at least on the system bus and, in those cases where the document is greater in size than main memory, the plain text might be temporarily stored on the computer's mass storage device (e.g., internal hard disk). This exposure problem poses a number of disadvantages associated with security.

One clear disadvantage is that plain text may be readable by an unauthorized person in those situations where it is not immediately removed from the internal hard disk or the hard disk is accessible to other computers through a local area network. Even if the sender diligently removes the plain text from the hard disk or the document as plain text is never stored on the hard disk, there is a possibility that an interloper may gain access to the plain text by simply monitoring the system bus of the computer through software (e.g., computer-virus) or hardware means (e.g., logic analyzer).

Another disadvantage is that there is no mechanism to guarantee that only the intended recipient can read the contents of a message when the message is sent in an encrypted format to a third party (e.g., system administrator) who is responsible for re-encrypting the message with a different encrypted format.

Yet another disadvantage is that there is no mechanism to protect against unauthorized use of data provided through content distribution or by software packages (i.e., copy protection).

Hence, it would be desirable to create a cryptographic device that sufficiently mitigates access to information in a non-encrypted format (i.e., plain text) originally contained within one source in one encrypted format and needs to be transferred to another source through another or even the same encrypted format. The cryptographic device would virtually eliminate any interlopers from stealing secure information because the interloper would have to obtain that information from integrated circuits inside the chip package which is clearly more difficult than obtaining information from bus lines.

BRIEF SUMMARY OF THE INVENTION

The present invention relates to a cryptographic device that decrypts information having a first encrypted format that is input into the cryptographic device producing information in a non-encrypted format. The non-encrypted information is subsequently re-encrypted according to a second encrypted format. The information having the second encrypted format is output from the cryptographic device. The decryption and re-encryption operations are accomplished entirely within the cryptographic device.

BRIEF DESCRIPTION OF THE DRAWINGS

The features and advantages of the present invention will become apparent from the following detailed description of the present invention in which:

FIGS. 2A–2D are illustrative block diagrams of various embodiments of the cryptographic device.

FIG. 3 is a more detailed block diagram of another illustrative embodiment of the cryptographic device.

DETAILED DESCRIPTION OF THE INVENTION

The present invention relates to an apparatus and method for translating information from one encrypted format to the same or another encrypted format without exposing the intermediary plain text to an unsecured environment. In the following description, numerous details are set forth in order to provide a thorough understanding of the present invention. However, it is apparent to one skilled in the art that the present invention may be practiced through many different embodiments than that illustrated without deviating from the spirit and scope of the present invention. In other instances, well-known circuits, elements and the like are not set forth in detail in order to avoid unnecessarily obscuring the present invention.

In the detailed description, a number of cryptography-related terms are frequently used to describe certain characteristics or qualities which is defined herein. A "communication key" is an encoding and/or decoding parameter used by cryptographic algorithms such as Rivest, Shamir and Adleman ("RSA") which uses public and private key pairs and Data Encryption Standard ("DES") which uses a select key shared in confidence between two parties. Normally, the communication key is a sequential distribution ("string") of binary data being "n" bits in length, where "n" is an arbitrary number. A "document" is generally defined as information (e.g., data, address, keys, etc.) being transferred in a sequence of bus cycles. "Plain text" is defined as non-encrypted information which may include, but is not limited to digital date representing text, video audio and other mediums.

Figure 1:
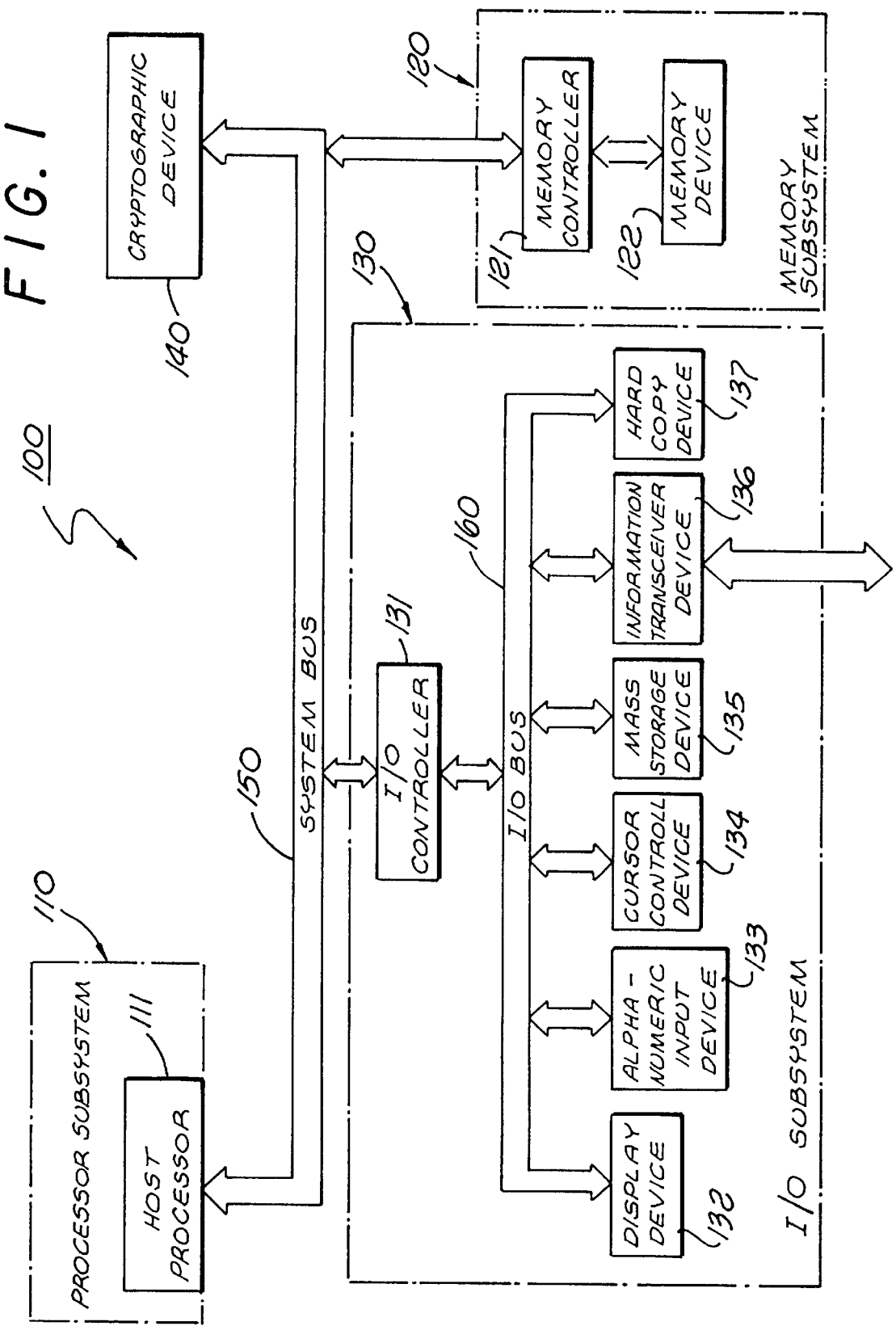
FIG. 1 is a block diagram of a computer system incorporating an cryptographic device associated with the present invention.

Referring to FIG. 1, an illustrative embodiment of a computer system 100 utilizing the present invention is illustrated. The computer system 100 comprises a plurality of subsystems including a processor subsystem 110, a memory subsystem 120 and an input/output ("I/O") subsystem 130. These subsystems and a cryptographic device 140 are coupled together through a system bus 150 which enables information to be communicated between the subsystems and the cryptographic device 140. It is contemplated that the cryptographic device 140 may alternatively be coupled to an I/O bus 160 (e.g., a PCI bus or ISA bus), a local bus within a host processor 111 or any bus mechanism.

The processor subsystem 110 includes the host processor 111 which executes instructions from the memory subsystem 120 and processes information from the computer system 100. While only one host processor 111 is shown, it is contemplated that more than one processor could be employed within the computer system 100. Moreover, the memory subsystem 120 may include a memory controller 121 controlling access to one or more memory device(s) 122 such as dynamic random access memory ("DRAM"), read only memory ("ROM"), video random access memory ("VRAM") and the like. The memory device(s) 122 store(s) information for use by the host processor 111.

The I/O subsystem 130 includes an I/O controller 131 which acts as an interface between an I/O bus 160 and the system bus 150. This provides a communication path for transferring information between devices coupled to different buses. The I/O bus 160 transfers information into and from at least one peripheral device in the computer system 100. Examples of the peripheral devices may include, but are not limited to a display device 132 (e.g., cathode ray tube, liquid crystal display, flat panel display, etc.); an alphanumeric input device 133 (e.g., keyboard, key pad, etc.); a cursor control device 134 (e.g., a mouse, trackball, touchpad, joystick, etc.); a mass data storage device 135 (e.g., magnetic tapes, hard disk drive, floppy disk drive, etc.); an information transceiver device 136 (fax machine, modem, scanner etc.) allowing information to be transferring from the computer system 100 to a remotely located system and vice versa; and a hard copy device 137 (e.g., plotter, printer, etc.). It is contemplated that the computer system 100 shown in FIG. 1 may employ some or all of these components or different components than those illustrated.

Besides a computer system, it is further contemplated that the cryptographic device 140 may be implemented in any electronic system that relies on encrypted communications. For example, these electronic systems may include cable television control boxes, bank ATM machines and perhaps networked peripheral nodes that could be configured to receive information in one encrypted format and transmit or store the information in another encrypted format. These examples are illustrative and should not be construed as a limitation to the present invention.

Figure 2A:
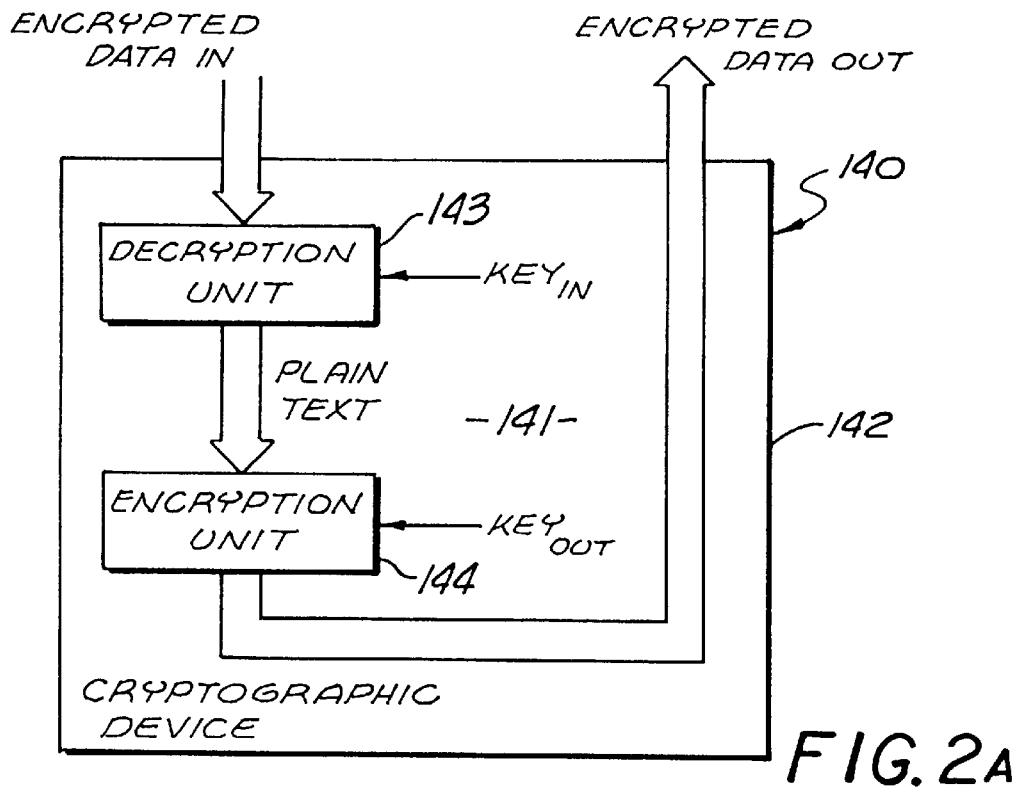

Referring now to FIG. 2A, the cryptographic device 140 is coupled to the system bus allowing it to receive information (e.g., documents, files, etc.) having a selected encrypted format from the information transceiver device and to re-encrypt (i.e., subsequently encrypt) the information into another encrypted format. The cryptographic device 140 comprises one or more integrated circuits 141 encapsulated within an integrated circuit component package 142, preferably hermetically encapsulated, to protect the integrated circuits 141 from damage, harmful contaminants and make it more difficult for interlopers to obtain the plain text or key information. The integrated circuits 141 feature a decryption unit 143 coupled to an encryption unit 144 of which the functionality of both units is described in a publication entitled "Applied Cryptography Second Edition: Protocols, Algorithms, and Source Code in C" by Bruce Schneider, published in 1996.

The decryption unit 143 receives information in a first encrypted format ("encrypted data in") and decrypts that information. Thus, the decryption unit 143 is configured with the necessary communication key "$KEY_{in}$" to decrypt the information thereby producing the information as plain text. Thereafter, the decryption unit 143 may be hardware or firmware implemented to function accordingly. The encryption unit 144 receives the plain text and re-encrypts it according to a selected communication key "$KEY_{out}$" to produce re-encrypted information ("encrypted data out"). The encrypted information is output from the cryptographic device 140 to the memory subsystem or mass storage device for storage or to the transceiver unit for transmission to another remotely located system.

The decryption unit 143 and encryption unit 144 may be hardware or firmware implemented to function as described above. Clearly, the decryption unit 143 and encryption unit 144 may be a general purpose microprocessor with cryptographic algorithms executed and plain text maintained within a secure environment or any intelligent electronic device capable of performing this decryption or encryption.

Figure 2B:
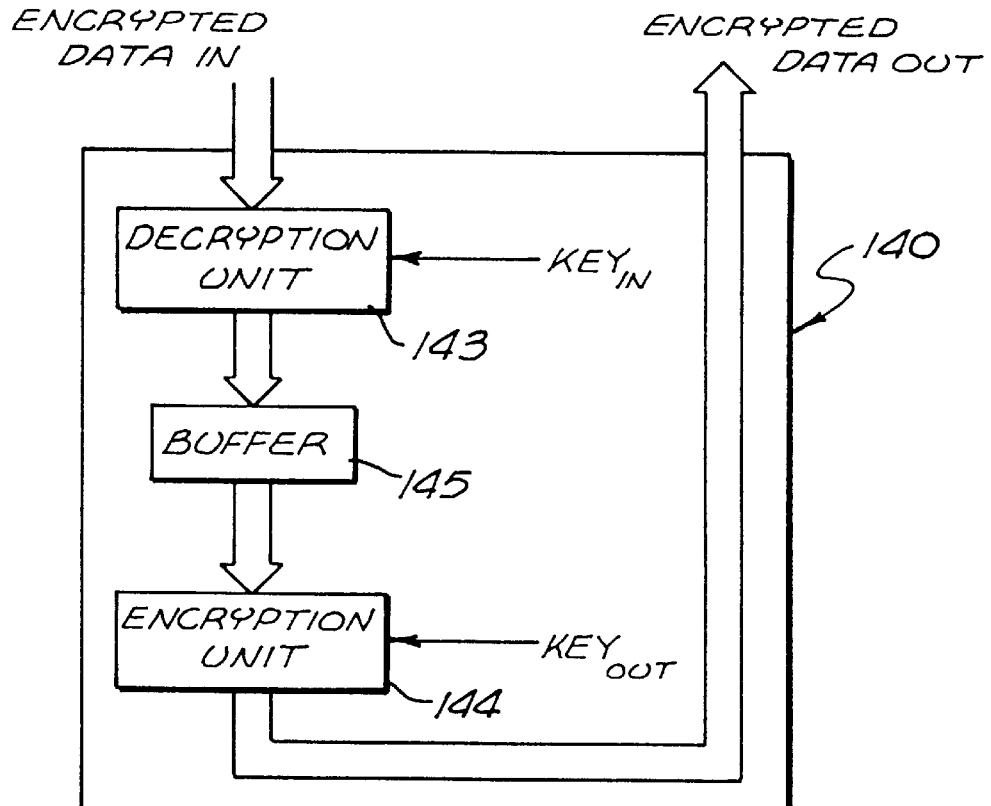

It is contemplated that other implementations may be used. For example, in FIG. 2B, a buffer 145 may be interposed between the decryption unit 143 and the encryption unit 144 to temporarily store the plain text. This implementation may be necessary if the encrypted formats differ enough to require timing adjustments to be made. In FIG. 2C, decryption and re-encryption are handled by the same cryptographic "unit" 146 which feeds back the plain text, preferably from a buffer 147, for re-encryption after decrypting the input information. In FIG. 2D, decryption and re-encryption are performed by a processor 148 obtaining requisite encryption and decryption algorithms from a memory element 149. Both the encrypted data input into the cryptographic device 140 and output from the cryptographic device 140 may be transmitted through to the bus through different or identical connection pins similar to that of FIGS. 2A–2C.

Referring to FIG. 3, a more detailed block diagram of a general purpose cryptographic device is shown incorporating features evident in FIGS. 2A–2D. The cryptographic device 140 includes a processor 200, a plurality of buffers 210 and 220, a memory element 230 and a plurality of cryptographic units 240 and 250. The cryptographic device 140 receives encrypted input information normally from a device coupled to the I/O bus, such as the mass storage device or the information transceiver device, or from the host processor. The encrypted information is selectively routed to the processor 200 via communication line 201 or to a first cryptographic unit 240 via communication lines 202 depending on the encrypted format of the input information. The routing selection is normally performed by the host processor 111. The reason for controlling data flow is that each cryptographic unit is able to only decrypt information in one type of encrypted format while the processor 200 may be configured to perform encryption or decryption at a slower speed by executing cryptographic algorithms contained in the memory element 230.

In the event that the encrypted information propagates into the first cryptographic unit 240, the first cryptographic unit 240 decrypts the encrypted information into a plain text format and transfers the decrypted information via communication line(s) 241 into the memory unit 230. Alternatively, in the event that the encrypted information propagates into the processor 200, the processor 200 executes a particular cryptographic alogrithm to decrypt the encrypted information and transmits the decrypted information in its plain text form into the memory unit 230 via communication line(s) 203.

In order to encrypt the plain text into a second encrypted format, three alternative data paths could be followed. A first data path is where the plain text is to be encrypted with the same format upon which the information was received. In this case, the plain text propagates through communication line(s) 242 into the first cryptographic unit 240 which, this time, encrypts the plain text into the first encrypted format and outputs that information into an output buffer 220 via communication line(s) 221. The second data path is where the plain text needs to be encrypted with an encrypted format not provided by either the first or second cryptographic units 240 and 250. In this situation, the plain text is transferred to the processor 200 via communication line(s) 204. The processor 200 receives the plain text and encrypts that information upon executing an associated cryptographic algorithm. Thereafter, the processor 200 transfers the encrypted information to the output buffer 220 via communication line(s) 222. A third alternative data path is where the plain text is to be encrypted with a format provided by a second cryptographic unit 250. The plain text is provided to the second cryptographic unit 250 via communication line(s) 251. The second cryptographic unit 250 encrypts the plain text into the second encrypted format and transmits that information to the output buffer 220 via communication line(s) 223. Thereafter, the output buffer 220 transfers the encrypted information to the system bus for storage in the memory device or mass storage device or for transmission to a remote system via the information transceiver device.

It is contemplated that copy protection may be provided by merely encrypting at least a portion of the context distributed data and that data being decrypted, processed and later encrypted for storage within the cryptographic device.

Figure 4:
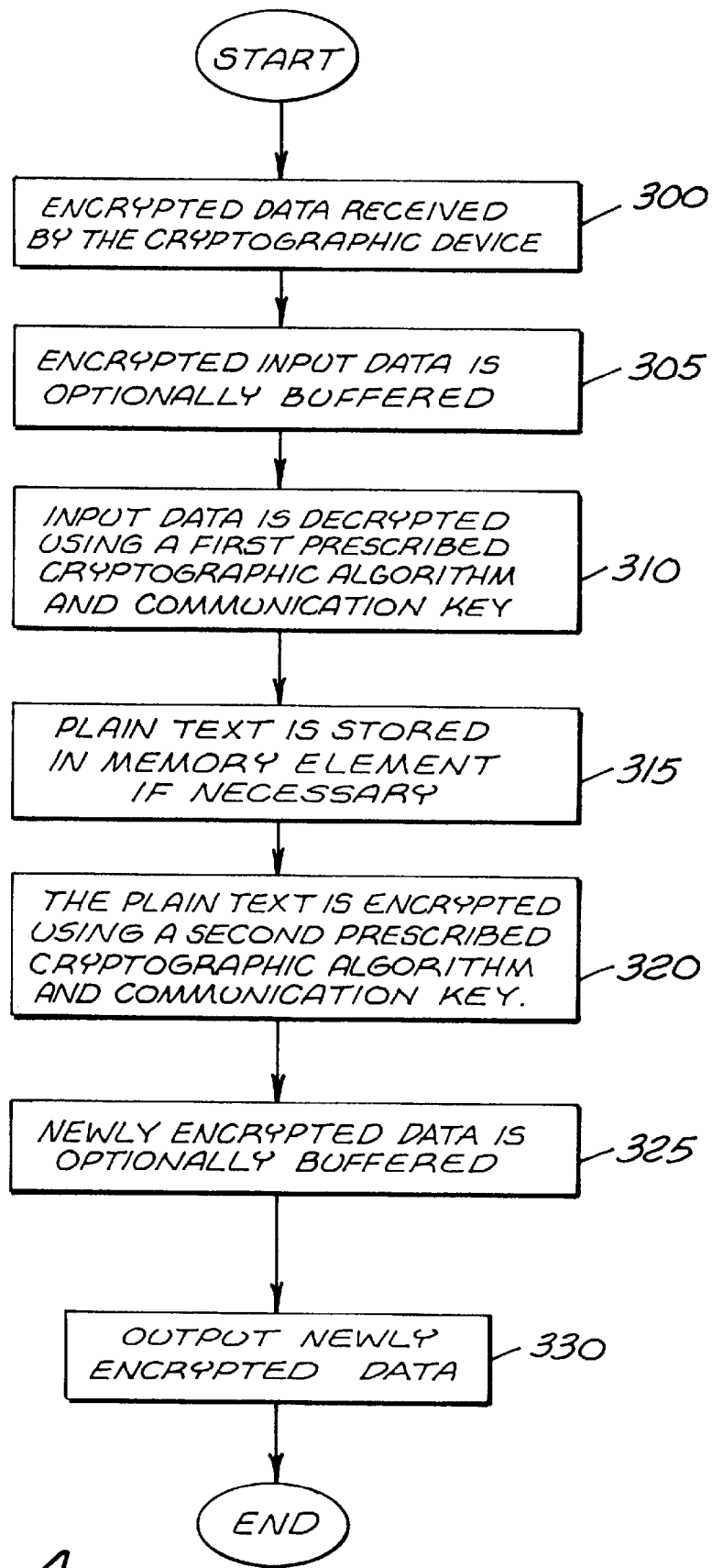
FIG. 4 is a flowchart illustrating the method for precluding access to information as plain text outside the cryptographic device.

Referring now to FIG. 4, a flowchart illustrating the re-encryption operations of data input into the cryptographic device is shown. In step 300, data encrypted with the first format is input into the cryptographic device. Next, in optional Step 305, the encrypted data is buffered for timing concerns. Next, in Step 310, the encrypted data is decrypted using a prescribed cryptographic algorithm and communication key. This operation may be performed through hardware, firmware or software depending on the chosen implementation. Upon decrypting the data, the plain text is stored in random access memory (within the device 140) if necessary (Step 315). Thereafter, in Step 320, the plain text is encrypted using a second prescribed cryptographic algorithm and communication key in the event that an encrypted format different from that input into the cryptographic device is desired or the first prescribed algorithm and communication key is used in the event that the encryption involves the same encrypted format as received at input. Next, in optional Step 325, the encrypted data is buffered for timing concerns similar to that of Step 305. Thereafter, the re-encrypted data is output from the cryptographic device for storage in the mass storage device or transmission through the information transceiver device 330. The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follows.

What is claimed is:

1. A cryptographic device comprising:
   an integrated circuit package;
   a decryption unit that uses a first cryptographic algorithm to decrypt input information having a first encrypted format into information having a non-encrypted format, the decryption unit contained within the integrated circuit package; and
   an encryption unit coupled to said decryption unit and contained in the integrated circuit package, said encryption unit using a second cryptographic algorithm to re-encrypts said information having the non-encrypted format into output information having a second encrypted format.

2. The cryptographic device according to claim 1, wherein the first encrypted format and the first cryptographic algorithm are different from the second encrypted format and the second cryptographic algorithm, respectively.

3. The cryptographic device according to claim 1, wherein the first encrypted format is identical to the second encrypted format.

4. The cryptographic device according to claim 1, wherein said decryption unit and said encryption unit are collectively a cryptographic processor which decrypts the input information to produce the information having the non-encrypted format and which re-encrypts the information having the non-encrypted format into the output information.

5. The cryptographic device component according to claim 1 further comprising a storage unit that temporarily contains therein the information having the non-encrypted format before transfer into said encryption unit.

6. The cryptographic device according to claim 5, wherein said decryption unit includes at least one of a first cryptographic processor and a processor executing a cryptographic algorithm contained within said storage unit.

7. The cryptographic device according to claim 6, wherein said encryption unit includes at least one of the first cryptographic processor, the processor and a second cryptographic processor.

8. A cryptographic device comprising:
   decryption means for using a first cryptographic algorithm to decrypt input information having a first encrypted format into information having a non-encrypted format;

encryption means for using a second cryptographic algorithm to re-encrypt said information having the non-encrypted format into output information having a second encrypted format; and integrated circuit packaging means for containing the decryption means and the encryption means.

9. Implemented within an integrated circuit package, a crytographic device comprising:

an input buffer;

an output buffer;

a first cryptographic processor coupled to said input buffer and said output buffer, said first cryptographic processor selectively using a first cryptographic algorithm to decrypt input information having a first encrypted format to produce information having a non-encrypted format and using a second cryptographic algorithm to selectively re-encrypt said information having the non-encrypted format into output information having a second encrypted format to be transferred to said output buffer;

a processing unit coupled to said input buffer and said output buffer, said processing unit selectively decrypts the input information using the first cryptographic algorithm to produce said information having the non-encrypted format and selectively re-encrypts said information using the second cryptographic algorithm into the output information to be transferred to said output buffer;

a memory element coupled to said first cryptographic processor and said processing unit, at least said information is contained within said memory element;

a second cryptographic processor coupled to said memory element and said output buffer, said second cryptographic processor selectively re-encrypts said information into the output information and transfers the output information to said output buffer; and an integrated circuit package containing the input buffer, the output buffer, the first cryptographic processor, the processing unit, the memory element and the second cryptographic processor.

10. A system comprising:

a bus;

a host processor coupled to said bus; and a cryptographic device coupled to said bus and implemented within a single integrated circuit package said cryptographic device internally decrypting input information having a first encrypted format into output information having a second encrypted format, said cryptographic device including a decryption unit to use a first cryptographic algorithm to decrypt the input information into information having a non-encrypted format, and an encryption unit to use a second cryptographic algorithm to re-encrypt said information having the non-encrypted format into the output information.

11. The system according to claim 10, wherein the first encrypted format and the first cryptographic algorithm of said input information of said cryptographic device are different from the second encrypted format and the second cryptographic algorithm of said output information, respectively.

12. The system according to claim 10, wherein the first encrypted format of said input information of said cryptographic device is identical to the second encrypted format of said output information.

13. The system according to claim 10, wherein said decryption unit and said encryption unit of said cryptographic device are collectively a cryptographic processor which decrypts the input information into said information having the non-encrypted format and which re-encrypts said information into the output information.

14. The system according to claim 10, wherein said cryptographic device further includes a memory element to temporarily contain said information having the non-encrypted format before transferring said non-encrypted information into said encryption unit.

15. The system according to claim 14, wherein said decryption unit of said cryptographic device includes at least one of a first cryptographic processor and a processor executing a cryptographic algorithm contained within said memory element.

16. The system according to claim 15, wherein said encryption unit of said cryptographic device includes at least one of the first cryptographic processor, the processor and a second cryptographic processor.

17. A system in communication with a remote device remotely located from the system, comprising:

a bus;

a host processor coupled to said bus; and a cryptographic device coupled to said bus, said cryptographic device internally decrypting input information from the remote device and internally encrypting output information to said remote device, said cryptographic device including a first cryptographic processor coupled to said bus and contained in an integrated circuit package, said first cryptographic processor for selectively decrypting the input information to produce information having a non-encrypted format and selectively re-encrypting said information having the non-encrypted format into the output information, a processing unit coupled to said bus, said processing unit for selectively decrypting the input information to produce said information into the output information, a memory element coupled to the first cryptographic processor and said processing unit, said memory element for containing at least said information, and a second cryptographic processor coupled to said memory element and said bus, said second cryptographic processor for selectively re-encrypting said information to produce said output information for subsequent output to the remote device.

18. The system according to claim 17, wherein said cryptographic device further comprises an input buffer connected between (i) said bus and (ii) to said first cryptographic processor and said processing unit, said input buffer receives said input information and transfers said input information to one of said first cryptographic processors and said processing unit; and an output buffer connected between (i) said bus and (ii) said first cryptographic processor, said second cryptographic processor and said processing unit, said output buffer receives said output information and places said output information on said bus.

19. A method for internally decrypting and re-encrypting data to produce output data having a requisite encrypted format, the method comprising the steps of:

receiving data having a first encrypted format within a secure environment of an integrated circuit package;

decrypting said data within the secure environment to produce data having a non-encrypted format; and re-encrypting within the secure environment said data having a non-encrypted format into data having a second encrypted format.

* * * * *

UNITED STATES PATENT AND TRADEMARK OFFICE
CERTIFICATE OF CORRECTION

PATENT NO.   : 5,805,706
DATED         : September 8, 1998
INVENTOR(S) : Derek L. Davis It is certified that error appears in the above-identified patent and that said Letters Patent is hereby corrected as shown below:

In column 7 at line 8 delete "crytographic" and insert --cryptographic--

Signed and Sealed this

Second Day of February, 1999

*Attest:*

*Attesting Officer*

*Acting Commissioner of Patents and Trademarks*